(No Model.)

C. A. BROWN & M. M. CLARK.
GALVANIC BATTERY.

No. 384,958. Patented June 26, 1888.

Witnesses:
Chas. G. Hawley.
Albert H. Parker

Inventors:
Charles A. Brown.
Martin M. Clark.
By George N. Barton
Attorney.

UNITED STATES PATENT OFFICE.

CHARLES A. BROWN AND MARTIN M. CLARK, OF CHICAGO, ILLINOIS, ASSIGNORS TO THE WESTERN ELECTRIC COMPANY, OF SAME PLACE.

GALVANIC BATTERY.

SPECIFICATION forming part of Letters Patent No. 384,958, dated June 26, 1888.

Application filed February 1, 1888. Serial No. 262,614. (No model.)

*To all whom it may concern:*

Be it known that we, CHARLES A. BROWN and MARTIN M. CLARK, citizens of the United States, residing at Chicago, in the county of Cook and State of Illinois, have invented a certain new and useful Improvement in Galvanic Batteries, (Case 1,) of which the following is a full, clear, concise, and exact description, reference being had to the accompanying drawings, forming a part of this specification.

Our invention relates to galvanic batteries, and its object is to provide a cheap and efficient means of holding the depolarizing compound or mixture against the carbon element. Heretofore peroxide of manganese and carbon have been mixed together and held against the carbon plate by a porous cup, the porous cup being contained in a jar containing a solution of sal-ammoniac, in which is inserted the zinc rod forming the positive element. In other batteries of this class bricks composed of suitable depolarizing agents have been held against the negative element by rubber bands. These batteries are known, respectively, in the trade as "Leclanché" batteries, the former being spoken of as the "porous-cup" battery and the latter as the "prism" battery.

The object of our invention is to cheapen the manufacture of this class of batteries, and by its use the porous cup is dispensed with, as also the necessity of forming the depolarizing compound into solid blocks or bricks.

Our invention consists, speaking generally, in substituting for the bricks a depolarizing mixture consisting, preferably, of equal parts of peroxide of manganese and carbon, this mixture being contained in bags which are tied to opposite sides of the carbon element. These bags are made preferably of canvas, and after being filled are tied up, the upper portion thereof being waxed.

Our invention is illustrated in the accompanying drawings, in which—

Figure 1:
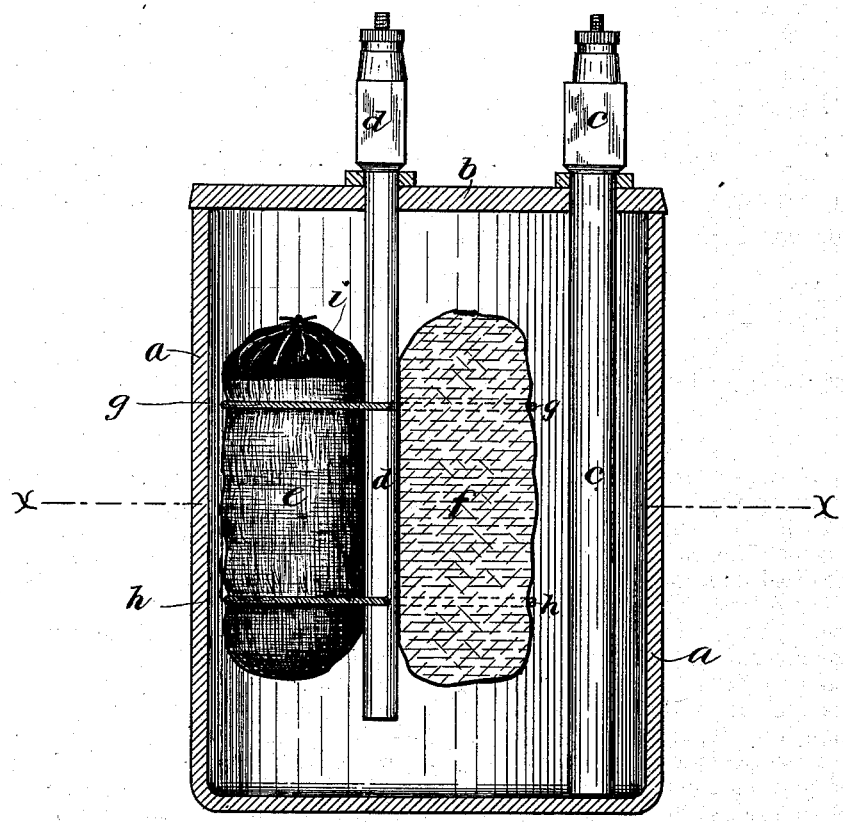
Figure 2:
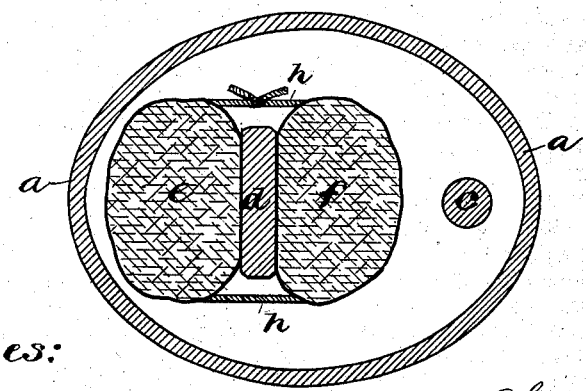

Figure 1 is a detailed view, partially in vertical section, of a cell of battery embodying our invention. Fig. 2 is a horizontal sectional view thereof on line $x\ x$ of Fig. 1.

$a$ is the usual glass jar, provided with the ordinary cover, $b$.

$c$ is the zinc rod.

$d$ is the ordinary negative carbon element. The bags $e\ f$, containing the depolarizing compound, are held against the carbon element on opposite sides by cords $g\ h$, as shown. When immersed in the solution, the cords shrink, thus tending to hold the bags more firmly against the negative element. The upper portions of the bags are waxed, as indicated at $i$, for the purpose of preventing the creeping of the solution to the top of the bags and thence to the cover of the jar and the connecting-post on the carbon. The jar contains a solution of sal-ammoniac to such a height as to preferably only partially cover the bags.

Having thus described our invention, we claim as new and desire to secure by Letters Patent—

The combination, with the negative element of a galvanic battery, of two bags containing a mixture of carbon and peroxide of manganese, said bags being secured to opposite sides of said negative element, substantially as described.

In witness whereof we hereunto subscribe our names this 17th day of January, A. D. 1888.

CHARLES A. BROWN.
MARTIN M. CLARK.

Witnesses:
   CHAS. C. WOODWORTH,
   GEORGE P. BARTON.